350-314.　SR

XR　3,909,524

United States Patent [19]

Ohkoshi et al.

[11] 3,909,524

[45] Sept. 30, 1975

[54] CATHODE RAY TUBE

[75] Inventors: Akio Ohkoshi; Takizo Shiota, both of Tokyo; Nobuo Kitamura, Sagamihara, all of Japan

[73] Assignee: Sony Corporation, Tokyo, Japan

[22] Filed: Aug. 20, 1973

[21] Appl. No.: 389,999

[30] Foreign Application Priority Data

Aug. 24, 1972 Japan .......................... 47-98837[U]

[52] U.S. Cl. ............... 178/7.85; 178/7.82; 178/7.8; 313/473

[51] Int. Cl.$^2$.. G02B 5/22; H01J 29/06; H01J 29/22

[58] Field of Search ....... 178/7.85, 7.86, 7.84, 7.82; 313/473

[56] References Cited

UNITED STATES PATENTS

| | | | |
|---|---|---|---|
| 2,909,770 | 10/1959 | Pugsley | 340/369 |
| 3,075,875 | 1/1963 | Hedler et al. | 156/295 |
| 3,215,776 | 11/1965 | Hamilton | 178/7.85 |
| 3,362,804 | 1/1968 | Hamilton | 65/18 |
| 3,708,622 | 1/1973 | Brown et al. | 178/7.82 |

*Primary Examiner*—Howard W. Britton
*Assistant Examiner*—Edward L. Coles
*Attorney, Agent, or Firm*—Hill, Gross, Simpson, Van Santen, Steadman, Chiara & Simpson

[57] ABSTRACT

A cathode ray tube having an optical filter disposed between the face panel of the cathode ray tube and a safety glass plate for preventing external light from being passed therethrough to the face panel and transparent resin injected between the face panel and the safety glass plate to secure the safety glass plate and the optical filter to the cathode ray tube in front of the face panel thereof. The optical filter is composed of a laminated element composed of alternate transparent layers and dark layers, the direction of extension of the laminations being substantially parallel to the face panel of the tube, i.e., with the contacting faces of each layer of the laminations being at right angles to the face panel or at a substantial angle thereto.

8 Claims, 8 Drawing Figures

CATHODE RAY TUBE

BACKGROUND OF THE INVENTION

1. Field of the Invention

The present invention relates generally to a cathode ray tube, and more particularly to a cathode ray tube suitable for use in a television receiver.

2. Description of the Prior Art

In the prior art, in order to improve the contrast of a cathode ray tube, the light-permeability of the face panel thereof is selected to be about 50% or a face panel is selected which is almost transparent (the light-permeability being about 80%) and which has the periphery of each phosphor stripe or dot made black. This latter arrangement is referred to as a black matrix, and this reduces the light-permeability of the face panel to about 50% overall so as to avoid the influence by external light possibility. In another case, by the provision of a suitable optical filter on the outer front face of the cathode ray tube, the reflection of external light is avoided to improve the contrast.

In the case where the light-permeability of the face panel is lowered, the power consumption of the cathode ray tube increases in order to maintain the desired picture brightness. This is not preferred from an economical point of view. Especially, in the case where the cathode ray tube is employed as a light projection type television receiver or a Braun tube in which a television picture is projected to a screen through optical system to be viewed, it is required that the projected image be brighter than ordinary in order to be properly viewed as a screen picture, which results in high power consumption.

If an optical filter is attached to a cathode ray tube in front of its end panel, it is possible to closely attach the optical filter to the front face of the cathode ray tube directly. However, in such a case, the optical filter is apt to be damaged from outside, so that it is necessary to protect the surface of the optical filter. Especially, if the optical filter is made of plastics, it is, of course, necessary to protect the same with, for example, a safety glass. However, up to now, there has been proposed no suitable protecting means.

SUMMARY OF THE INVENTION

It is an object of the present invention to provide a cathode ray tube suitable for use in a television receiver in which a novel optical filter and a safety glass plate are attached to the cathode ray tube in front thereof.

It is another object of the present invention to provide a cathode ray tube in which a novel optical filter and safety glass plate may be easily attached to the cathode ray tube in front thereof to avoid the glass of the cathode ray tube being scattered if the tube explodes.

Another and further object of the present invention is to provide a novel cathode ray tube having an optical filter disposed between the face panel of the cathode ray tube and a safety glass plate for preventing external light from being passed therethrough to the face panel and transparent resin injected between the face panel and the safety glass plate to secure the safety glass plate and the optical filter to the cathode ray tube in front of the face panel thereof. The optical filter is composed of a laminated element composed of alternate transparent layers and dark layers, the direction of extension of the laminations being substantially parallel to the face panel of the tube, i.e., with the contacting faces of each layer of the laminations being at right angles to the face panel or at a substantial angle thereto.

Other objects, features and advantages of the present invention will become apparent from the following description taken in conjunction with the accompanying drawings.

DESCRIPTION OF THE PREFERRED EMBODIMENTS

The present invention will be now described with reference to the drawings.

Figure 1:
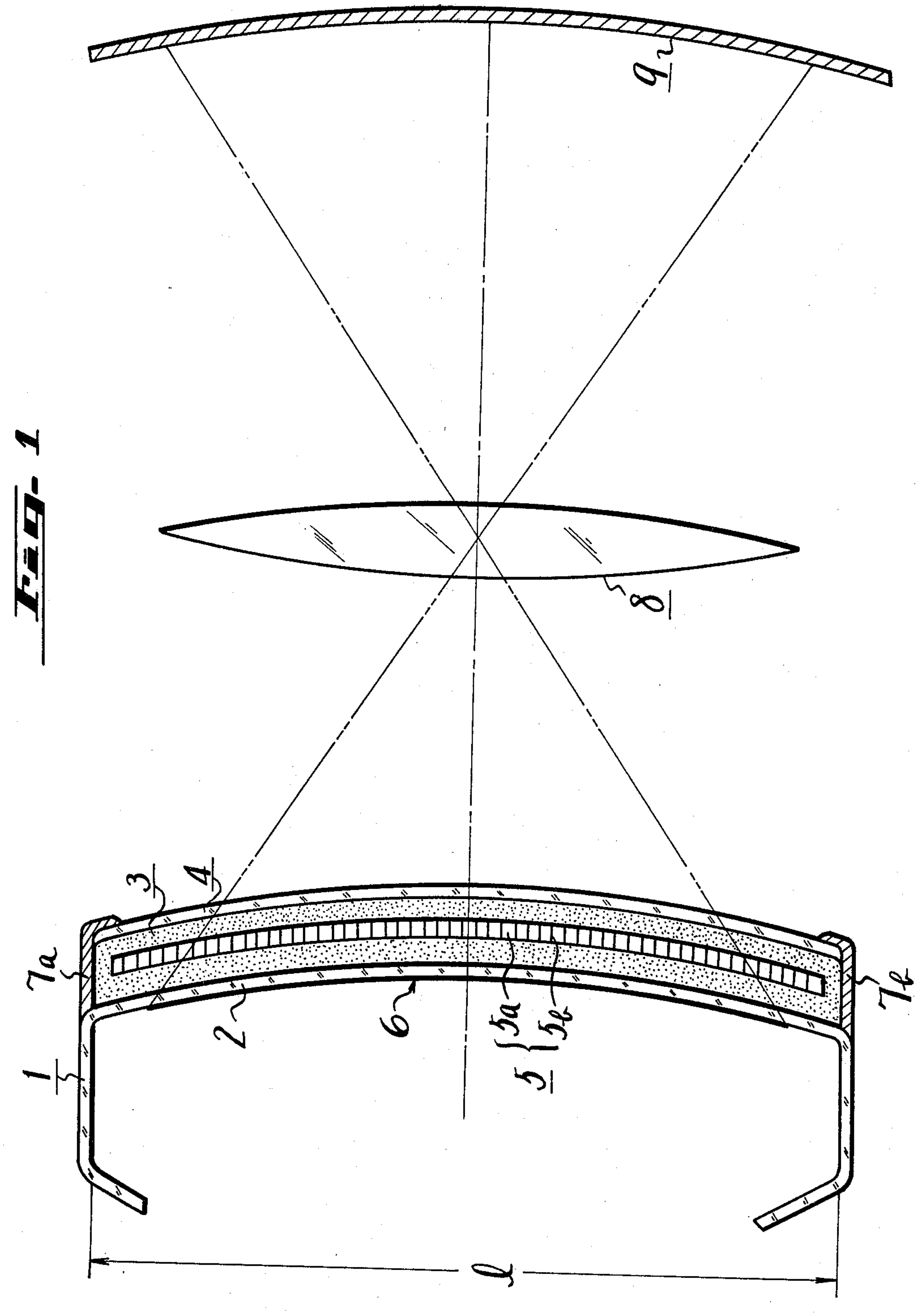
FIG. 1 is a cross-sectional view showing an example of the cathode ray tube according to the invention, in which the cathode ray tube is employed in a light projection type television receiver.

In FIG. 1, a cathode ray tube or Braun tube 1 is shown (which will be hereinafter referred to simply as a CRT), which tube has attached to its face panel 2, a front panel such as a safety panel 4 through a transparent adhesive agent layer 3 to cover all of the face panel 2. An optical filter such as an external light shielding member 5, which is formed by laminating a number of transparent layers 5*a* and light absorbing layers 5*b* alternately, is embedded in the adhesive agent layer 3.

The layer 3 may be formed of transparent synthetic resin such as polyester resin with adhesion, and is selected to have a proper thickness, preferably from several millimeters to several ten millimeters in accordance with the thickness of the optical filter or the external light shielding member 5. The safety panel 4 which serves as the front panel may be formed of transparent resin, transparent glass or the like known to the art.

Figure 2:
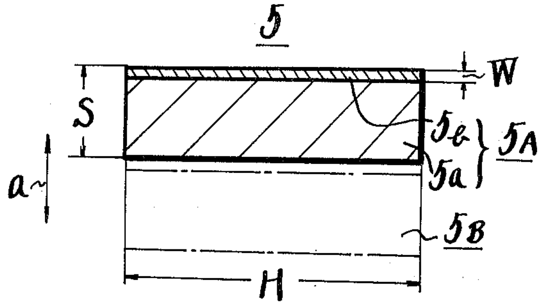
FIG. 2 is a cross-sectional view showing a part of an external light shielding member which constitutes an important part of the invention.

The arrangement of the external light shielding member 5 which is embedded in the adhesive layer 3 will be now described. As shown in FIG. 2, a single element 5A of the light shielding member 5 consists of a transparent layer 5*a* made of transparent resin such as polyester or the like and a light absorbing layer 5*b* coated on one surface of the transparent layer 5*a* in the illustrated example. In this case, the light absorbing layer 5*b* is made of black paint such as carbon, silica or the like having a thickness W. A large number of single elements 5B, 5C . . . each of which is substantially the same as the element 5A in construction and size, are laminated sequentially with a predetermined width H to form the optical filter or external light shielding member 5. In this case, the lamination direction *a* of the respective elements 5A, 5B, 5C . . . is selected substantially in parallel to the plane of the face panel 2, thus enabling the light shielding member 5 to be embedded in the adhesive layer 3, as shown in FIG. 1. In FIG. 1, references 7*a* and 7*b* show sheets made of synthetic resin for closing the adhesive layer 3 in the compartment defined by the face panel 2 and the safety panel 4.

The dimension of the external light shielding member 5 relative to the face panel 2 and the safety panel 4 will be now described. If it is assumed that the longitudinal length of the face panel 2 (equal to the longitudinal length of the effective picture screen or face) is taken as $l$, the number of horizontal scanning lines as $n$ and the number of lamination of the shielding elements 5A, 5B, 5C . . . as M, the number M being selected to satisfy the condition $M \geqq 2n$ so as to avoid the generation of moire on the screen. In other words, the number of the light absorbing layers 5*b* is selected to be M. Further, if the thickness of each of the shielding elements 5A, 5B, 5C . . . or the pitch of their arrangement is taken as S, the thickness S is selected to satisfy $S = l/M$. If the pitch S is selected as mentioned above, the angle of light emitted from a phosphor 6 is restricted by the pitch S and hence the light emitted from the phosphor 6 is totally reflected on the front panel 4, but the phosphor 6 is not obscured by the total reflection of the light therefrom on the front panel 4.

The number of the horizontal scanning lines of a television receiver used in Japan is 525, so that the lamination number M is equal to or larger than 1050 (M = 1050). If the shielding member 5 is applied to a television receiver of 14-inch type, since the longitudinal length $l$ of the face panel 2 is about 22cm, the thickness S is 22/1000 cm or 22 microns if the number M is selected 1000. In this case, if the thickness W of the light absorbing layer 5*b* is selected to be S/10, it becomes 2.2 microns. The width H of each of the light shielding elements 5A, 5B . . . is about 2 to 10mm.

One thousand of the light shielding elements 5A, 5B, 5C . . . each of which is selected to be 22 microns in its S diameter, 2.2 microns in its W dimension, and 2 to 10 mm in its H dimension, are laminated to form the external light shielding member 5 which is embedded in the adhesive agent layer 3 in parallel to the curved surface of the face panel 2.

If an optical filter, such as the external light shielding member 5, is disposed in front of the face panel 2 of the CRT 1, there is no danger that external light will arrive at the face panel 2 to deteriorate the contrast. That is to say, the external light impinging on the external light shielding member 5 is absorbed by a number of the light absorbing layers 5*b*. This is especially true of external light impinging on the member 5 at an angle with respect to the tube axis once this is substantially absorbed by the light absorbing layers 5*b* on their upper and lower surfaces, so that the face panel 2 is prevented from being irradiated by the external light. As a result, the contrast of the CRT 1 is improved as compared with the prior art and hence a much brighter picture can be obtained. Also, if the light-permeability of the face panel 2 is increased by about several ten percents to be, for example, in the order of 80 percents, brighter pictures can be obtained.

When a CRT 1, provided with the optical filter, such as the external light shielding member 5, is used as a light projecting type tube, as shown in FIG. 1, an optical lens 8 is disposed in front of the front glass plate 4 of the CRT 1 and a screen 9 is located apart from the lens 8 and the front glass 4 by a predetermined distance. In this case, the optical lens 8 is positioned in collimation with respect to the phosphor 6 of the CRT 1. Thus, the television picture formed on the phosphor screen 6 is projected by the lens 8 onto the screen 9 as a clear picture. In this case, if the light-permeability of the face panel 2 is selected to be about 80%, the television picture which is projected onto the screen 9 becomes very bright, and the picture formed on the screen 9 has its contrast greatly improved. The improved contrast results in a better picture.

Figure 3:
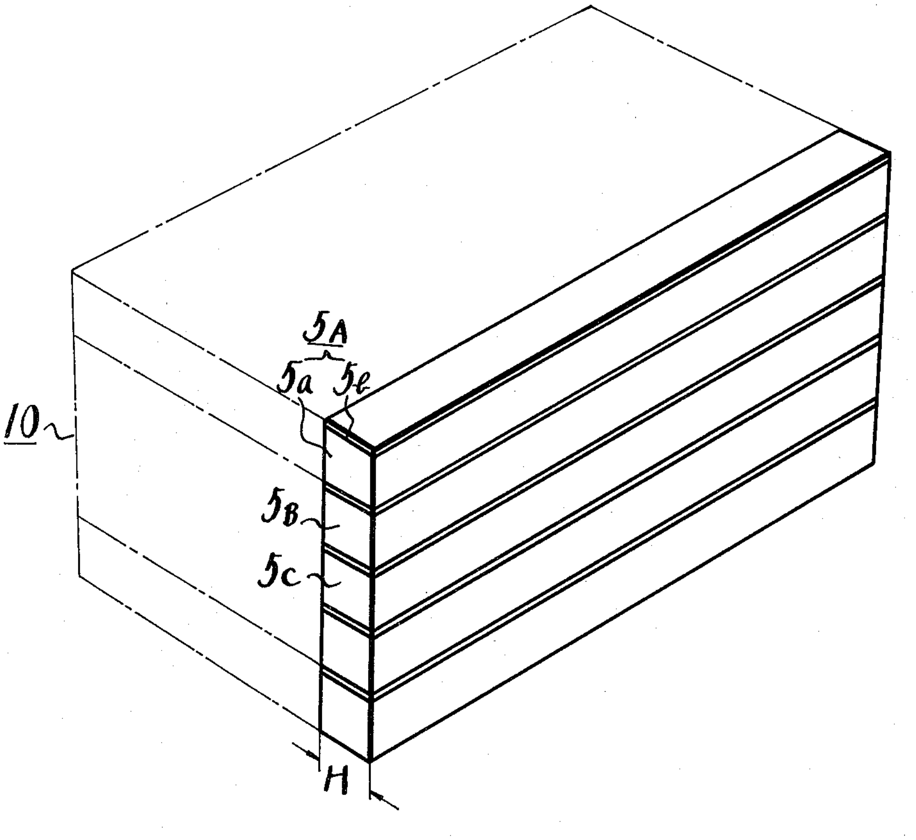
FIG. 3 is a perspective view showing a process for making the light shielding member.

An optical filter, such as the external light shielding member 5, can be made as shown in FIG. 3. A number of the shielding elements 5A, 5B, 5C . . . , each of which consists of a transparent layer 5*a* and a light absorbing layer 5*b* as described in connection with FIG. 2, are laminated to form an element 10 shown in FIG. 3 by the dash-dot line and then the element 10 is cut along the longitudinal direction in the figure to form a plurality of the members 5 each of which has the predetermined width H. The thus cut member 5 is so disposed between the face panel 2 and the safety glass panel 4 that the cut base of the member 5 is substantially in parallel with the face panel 2. An adhesive agent is then injected into the compartment between the face panel 2 and the safety glass plate 4 to physically secure the member 5 and the safety glass panel 4 to the CRT 1. A desired CRT is thus obtained.

The external light shielding member 5 can be also made by winding a single light shielding element, for example, 5A, into a coil and then cutting the wound element 5A along its radius direction.

Since the CRT 1 of the present invention is provided with the external light shielding member 5 in front of its face panel 2, external light is effectively prevented from reaching the face panel 2 by the member 5 to improve the contrast. Accordingly, in the present invention there is no need to select the light-permeability and light reflectivity of a face panel of a CRT to be about 50% to improve the contrast as in the prior art, but on the contrary, the light-permeability of the face panel 2 may be increased to be about 80% to form a bright picture, without deteriorating the contrast.

Further, the present invention can avoid undue power consumption caused by decreasing the light-permeability in the prior art, and hence, is superior from economical point of view. Therefore, it will be understood that the CRT 1 of the present invention has a great advantage when it is employed as an image projecting type television receiver.

Since in the present invention the external light shielding member 5 is embedded in the adhesive agent layer 3, it is supported with the necessary mechanical strength and has a long life span.

The above description is made for the case where the light shielding member 5 is arranged in the layer 3 in such a manner that the light absorbing layers 5*b* are substantially perpendicular to that of the face panel 2. It is, however, possible to have the light absorbing layers 5*b* obliquely arranged at an angle with respect to the face panel 2, that is to say, the light shielding member 5 has the effect of being obliquely disposed in front of the face panel 2. In this case, external light falling on the face panel 2 can be substantially absorbed irrespective of its incidence angle. It is also preferable in this case to dispose the member 5 in such a way that the lamination direction *a* of the shielding elements 5A, 5B, 5C . . . is substantially parallel to the plane of the face panel 2.

With the present invention, the external light shielding member 5 is spaced from the face panel 2 by a predetermined distance, so that it has no influence on an image projected onto the screen 9 from a television receiver.

In order to attach the optical filter or the light shielding member and the safety glass plate to the CRT in front thereof, injection inlets are provided to a gap between the face panel of the CRT and the light shielding member and to a gap between the light shielding member and the safety glass plate to inject an adhesive agent such as molten thermoplastic synthetic resin thereinto through the injection inlets. According to such a method, when the molten thermoplastic synthetic resin is charged into one gap, the charging of the molten thermoplastic synthetic resin into the other gap must be stopped. The working efficiency under such circumstances would not be maximum.

Figure 4:
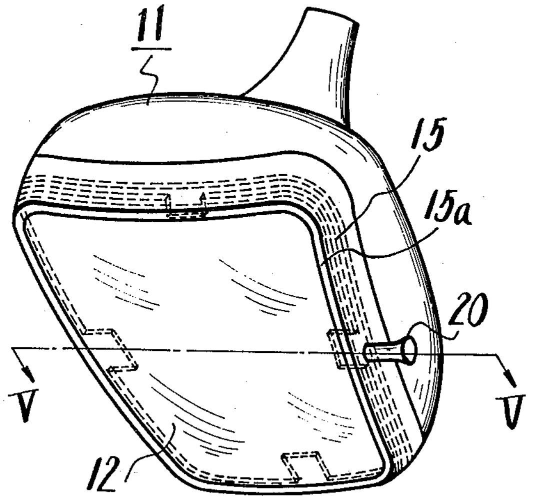
FIG. 4 is a perspective view showing another example of the cathode ray tube of the invention.
Figure 5:
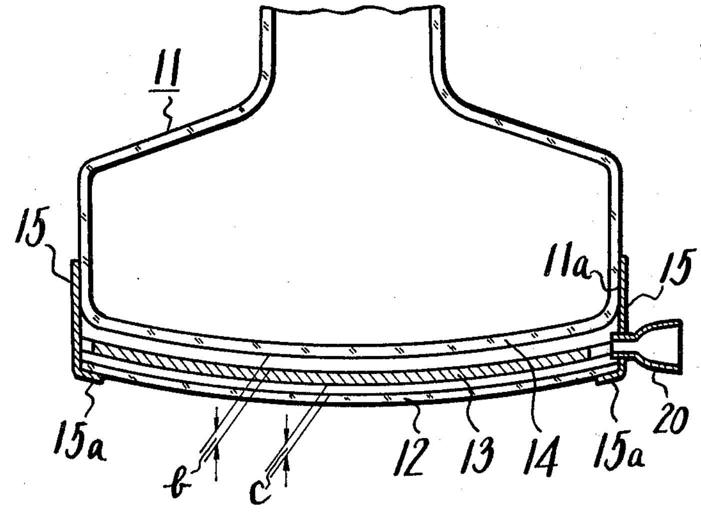
FIG. 5 is a cross-section along the line V—V in FIG. 4.
Figure 6:
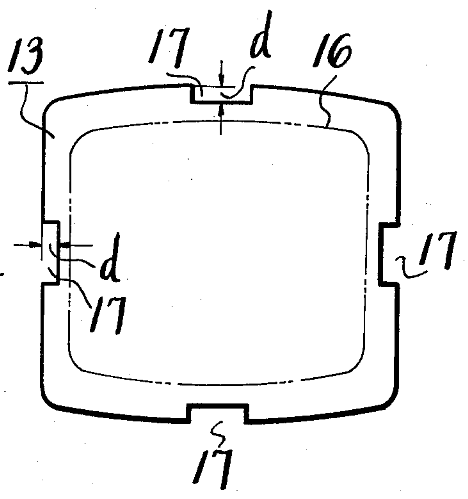
FIG. 6 is a schematic plan view showing an example of an optical filter made of plastics used in this invention.

With reference to FIGS. 4 and 5, another example of the invention will now be described. A CRT 11 is provided with a safety glass plate 12 substantially equal to the face panel 14 in shape. An optical filter 13 made of plastic material similar to the light shielding member 5 (which will be hereinafter referred to as simply a plastic filter) is disposed in the clearance between the face panel 14 of the CRT 11 and the safety glass plate 12. The plastic filter 13 has the shape as shown in FIG. 6. The contour of the plastic filter 13 is formed the same as that of the face panel 14 of the CRT 11. Recesses 17 of predetermined size and shape are formed on the outside of the effective picture screen or area 16 of the plastic filter 13, which area 16 is shown in FIG. 6 by the dot-dash line in such a manner that the recesses 17 are disposed on the respective side sections of the rectangular plastic filter 13. The depth *d* of the recesses 17 can be varied unless the recesses 17 come into the effective picture area 16 of the plastic filter 13 which is attached to the CRT 11 in a similar manner so that the external light shielding member 5 is attached to the CRT 1.

Figure 8:
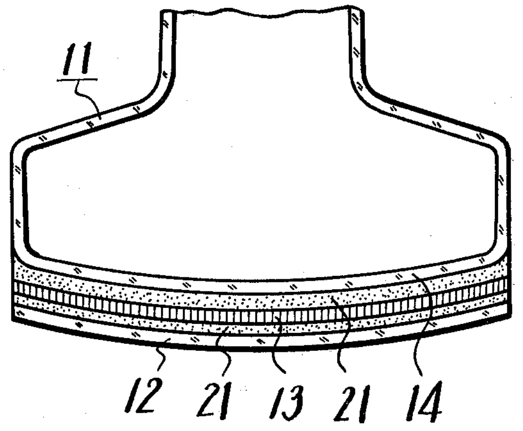
FIG. 8 is a cross-sectional view showing a further example of the cathode ray tube of the invention.

The description will be now given for the manner by which plastic filter 13 and the safety glass plate 12 are attached to the CRT 11 in front of its face panel 14. The CRT 11 is fixed, the plastic filter 13 is held in spaced apart relation in front of the face panel 14 of the CRT 11 by a distance *b*, the safety glass plate 12 is held in front of the plastic filter 13 spaced apart therefrom by a distance *c*, and then the outer peripheral surface 11a of the CRT 11 near its face panel 14, the outer periphery of the plastic filter 13 and the outer periphery of the safety glass plate 12 are surrounded by an adhesive tape 15 to be bound together. The projected peripheral edge portion 15*a* of the adhesive tape 15 is bent to be bound to the front face of the safety glass plate 12. Thereafter, an injection inlet 20 is provided through the adhesive tape 15 at the position corresponding to one of the recesses 17 of the plastic filter 13. Molten transparent synthetic resin 21, such as a polyester resin or an epoxy resin is charged through the inlet 20 into the compartment defined by the face panel 14, the safety glass plate 12 and the plastic filter 13. With this arrangement, the molten synthetic resin 21 is sufficiently and uniformly charged into whole of the compartment by the provision of the recesses 17. After the molten synthetic resin 21 has been hardened, if the adhesive tape 15 is removed from the outer peripheral surface 11*a*, the front surface of the safety glass plate 12 and so on, the CRT 11 is obtained as shown in FIG. 8.

With the invention described as above, since the recesses 17 are formed on the plastic filter 13 outside the effective picture area 16 thereof, the molten synthetic resin 21 for binding the plastic filter 13 and the safety glass plate 12 to the CRT 11 in front thereof can be filled into both the compartments between the face panel 14 and the plastic filter 13 and between the plastic filter 13 and the safety glass plate 12 through the recesses 17, so that even if any one of the compartments is filled first with a molten synthetic resin, and no problem occurs. Thus, the attaching of the plastic filter 13 and the safety glass plate 12 to the CRT 11 is made quite easy.

Further, with the CRT 11 of the present invention since the safety glass plate 12 is provided in front of the CRT 11, the plastic filter 13 is prevented from being injured on its surface and since the plastic filter 13 and the safety glass plate 12 are bound to the CRT 11 by means of synthetic resin, even if the CRT 11 is accidentally exploded, the scattering of glass is prevented.

Figure 7:
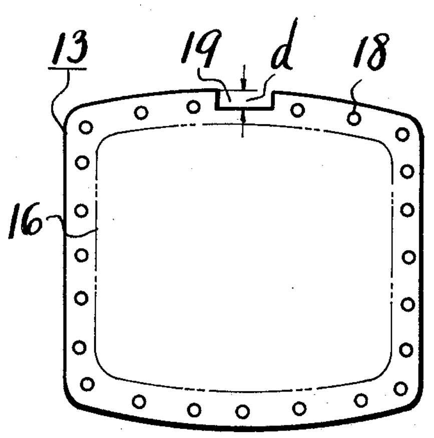
FIG. 7 is a schematic plan view showing another example of the optical filter made of plastic and used in this invention.

FIG. 7 shows another example of the plastic filter 13 which is formed to have a configuration similar to that of the face panel 14 of the CRT 11 as that shown in FIG. 6. In this example, a plurality of bores 18 are formed through the plastic filter 13 at its outer periphery outside its effective picture area 16 and one recess 19 is formed on the outer periphery of the plastic filter 13 outside its effective picture area 16 for receiving the inlet 20. The depth *d* of the recess 19 is selected not to intrude into the effective picture area 16. Therefore, it will be easily understood that the plastic filter 13 of this example is similarly attached to the CRT 11 with the same effect as that of the plastic filter 13 shown in FIG. 6.

It will be apparent that many modifications and variations can be effected without departing from the spirit and scope of the novel concepts of the present invention.

We claim as our invention:

1. A cathode ray tube having a face panel and a transparent safety plate mounted on said tube in spaced relation to said face panel, an optical filter mounted between said face panel and said safety plate in a transparent resin which fills the space between said face panel and said safety plate and holds said filter in place, said optical filter comprising a composite sheet made of a plurality of parallelepipeds of transparent material having a first viewing side facing toward said safety plate, a second side parallel to said first side and facing said face panel, and third and fourth sides parallel to each other and respectively joining said first and second sides, a light impervious layer on at least one of said third and fourth sides and said plurality of parallelepipeds joined on their third and fourth sides together to form a sheet filter structure such that the light impervious layer is between adjacent parallelepipeds.

2. A cathode ray tube according to claim 1, wherein said first and second sides are substantially at right angles to said third and fourth sides.

3. A cathode ray tube according to claim 1, wherein said first sides are at an oblique angle to said third sides.

4. A cathode ray tube according to claim 1, wherein said plurality of parallelepipeds extend substantially horizontal.

5. A cathode ray tube according to claim 1, wherein the number of parallelepipeds is greater than twice the number of horizontal scanning lines.

6. A cathode ray tube according to claim 1, wherein said optical filter substantially covers the whole face panel.

7. A cathode ray tube as defined by claim 6, in which at least one recess is formed on the outside of the effective picture area of said optical filter.

8. A cathode ray tube as defined by claim 6, in which a plurality of openings are formed on the outside of the effective picture area of said optical filter.

* * * * *